J. G. ZIMMERMAN.
AUTOMATIC SYNCHRONIZER.
APPLICATION FILED NOV. 28, 1913.

1,231,109.

Patented June 26, 1917.

Witnesses
Rob. E. Stoll.
J. D. Rowe

J. G. Zimmerman Inventor
By G. J. Dilkin
Attorney

UNITED STATES PATENT OFFICE.

JAMES G. ZIMMERMAN, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

AUTOMATIC SYNCHRONIZER.

1,231,109.  Specification of Letters Patent.  Patented June 26, 1917.

Application filed November 28, 1913. Serial No. 804,106.

*To all whom it may concern:*

Be it known that I, JAMES G. ZIMMERMAN, a citizen of the United States, residing at Milwaukee, in the county of Milwaukee and State of Wisconsin, have invented a certain new and useful Improvement in Automatic Synchronizers, of which the following is a specification.

This invention relates generally to systems of electrical distribution wherein alternating, intermittent or pulsating currents are utilized, and it has particular relation to apparatus for insuring the interconnection of a plurality of units of such a system, whether they produce or consume energy, at a moment when the currents of such units are alike both as to phase and frequency or, in other words, when these currents are in true synchronism.

As is well known, resonant bodies, such as tongues or reeds, have a definite natural period of vibration, and if impulses, whether mechanical or magnetic, of this definite period are applied to such a resonant body, this element will be set in vibration and the period of vibration will be the natural period of vibration of the reed, or other resonant body. If, however, impulses of some other frequency are impressed on the reed, while the latter may be set in vibration, nevertheless, the vibrations will be comparatively slight and of much less amplitude than the vibrations of the reed when impulses of the same frequency as the natural frequency of vibration of the reed are applied. By proper selection of the reed, both as to length and mass, a vibrating element may be obtained that will move through any desired angular distance, when vibrating at its natural period, and by utilizing this reed as the armature of an electromagnet, it is possible to apply magnetic impulses to said reed of a frequency corresponding to the frequency of the magnetizing current. If two coils carrying currents of different frequencies and phase relation are used for creating flux in this magnet, the magnetic impulses on the reed will have a frequency and intensity which are resultants of those produced by the two currents. The frequency of one of the magnetizing currents may change relatively to that of the other, and eventually, when the frequencies of the two are the same, the number of magnetic impulses on the reed armature will be equal to the number of natural vibrations of the reed. The reed now attains its maximum vibration for impulses of a certain intensity, which intensity depends on the phase relation of the two magnetizing currents, which are now supposed to be of the same frequency. When the phase relation is approximately the same, the intensity of the impulses is greatest and hence the extent of the to and fro movements is a maximum.

With a reed as described, it is possible to utilize this effect of attaining its maximum vibrating movements only when the magnetizing currents are alike in frequency and phase by placing a contact or contacts in such position that, when the reed attains its maximum vibration, a local circuit is closed to close a synchronizing switch between the sources producing the two magnetizing currents.

An object of the invention is to produce an improved system in which any one of a plurality of units may be synchronized and automatically connected with a circuit already being fed by any one or more units.

A further object of the invention is to provide an improved apparatus which is responsive to the frequency and phase relation of the currents in the units to be interconnected, which will operate to connect the incoming unit to the line when the current produced thereby coincides, both as to frequency and phase, with the line current.

A more specific object of the invention is to accomplish the synchronizing of the various units by an improved apparatus making use of the properties of a vibrating reed, such an element being utilized as the armature of an electromagnet in which magnetic effects are produced by the various units to be synchronized.

The various novel features of the invention will appear from the description and drawing, disclosing one embodiment of such invention, and will be particularly pointed out in the claims.

An alternating current distributing circuit 10 is adapted to be connected to any or all of the units A, B, C, through the switches 11, 12, 13, respectively, normally biased to closed position and held open by latches 14, 15, 16, respectively. As an embodiment of the invention, these units may be considered as generators, any one or more of which is adapted to supply the circuit 10. The latches are adapted to be tripped by solenoids 17, 18, 19, respectively, on the closure of their respective circuits.

Figure 1:
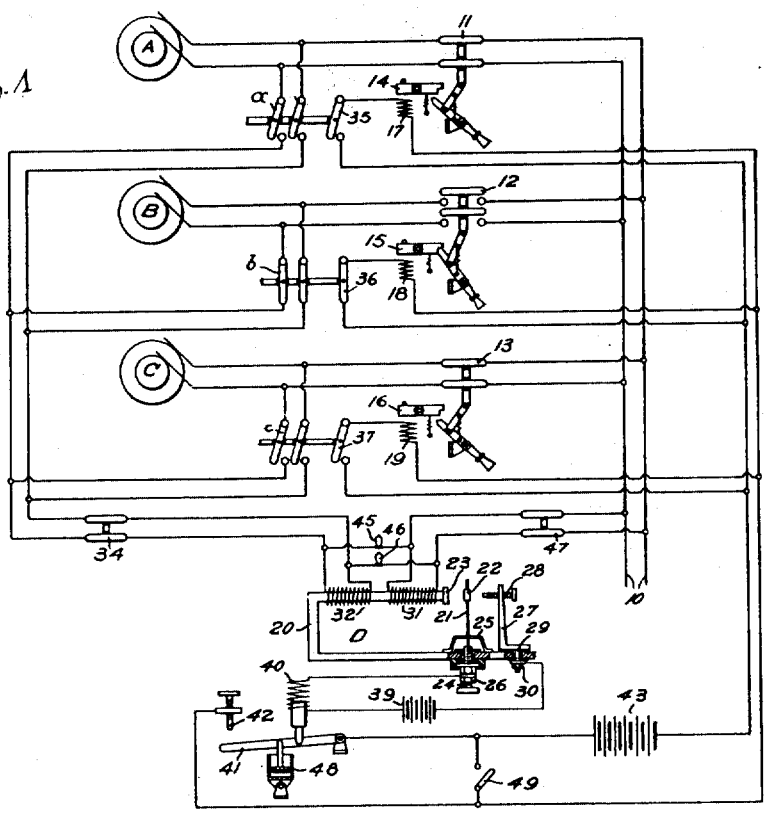
Figure 1 is a diagrammatic view of a distributing system, utilizing a synchronizing apparatus embodying the invention, and shown in elevation.

As illustrated in Fig. 1, an automatic synchronizer D is used for completing the circuits of any of the tripping solenoids 17, 18, 19. The synchronizer comprises a core 20 of magnetic material and an armature 21. This armature may be in the form of a magnetic reed or tongue and may have an enlargement 22 adapted to engage a pole face 23 of the core 20, or the reed, itself, may be of non-magnetic material, and the portion 22 of magnetic material, in accordance with this invention. The end of the reed remote from the pole face 23 is secured to the end of a screw 24, adjustable through a portion of the core 20, to vary the effective length of the reed by changing the length of the portion thereof that extends beyond the support 25, through which the reed passes with a comparatively close fit. The screw 24 and the support 25 may be suitably insulated from the magnet core 20 by insulating thimble and washers. The screw 24 may also be provided with a lock nut 26 for holding the screw in adjusted position.

Mounted on the core 20 and adjacent the armature is a support 27 for an adjustable contact 28, adapted to be engaged by a portion of the armature 21. This support is secured in place, as by a bolt 29 and nut 30, and may be suitably insulated from the core 20 by insulating washers.

The core 20 is provided with two windings, 31 and 32, the former being connected across the line circuit 10, and the latter being adapted to being connected across the terminals of any of the units A, B, C, through the switches $a$, $b$, $c$, respectively. A switch 34 may also be provided in the circuit of the coil 32 for breaking said circuit independently of switches $a$, $b$, $c$, and a switch 47 may be connected in the circuit of coil 31 to break said circuit when the synchronizer D is not in use. Connected to operate with the switches $a$, $b$, $c$, are the switches 35, 36, 37, respectively, each adapted to close the circuit of the corresponding tripping solenoid 17, 18, or 19. One or more lamps may be connected across like terminals of the coils 31, 32 to indicate, by the comparative brilliancy of the lamps, the relative drop across said terminals at different instants.

Connected with the adjusting screw 24 and the securing bolt 29, are the terminals of a local circuit supplied by a battery 39, so that, when the reed armature 21 is in engagement with the adjustable contact 28, this local circuit is completed. Located in this circuit is the winding of a magnet 40, which, when energized, draws up its core to operate the switch arm 41 to closed position in engagement with contact 42. This switch 41 closes the circuit of the battery or other source 43 through the tripping coil 17, 18, 19 and switches 35, 36, 37, respectively.

In operation, it may be considered that two of the machines, A and C, as shown in Fig. 1, are supplying the line 10, and that it is desirable to connect the machine B into circuit to assist the machines A and C. If the switch 47, connecting the coil 31 of the synchronizer to the line, is not already closed, the same should be moved to closed position. The switch 34 is closed, if not already so, and switches $b$ and 36 are moved to closed position, as shown. The natural frequency of vibration of the reed is adjusted through the screw 24 so as to be the same as that of the current in the supply circuit 10. The coils are so connected to their supply sources that when the currents therein are of the same phase relation, their magnetic effects in the core 20 are added. As long as the frequency of the current of the incoming generator B is less than that of the line, the frequency of the magnetic impulses on the armature 21 will be less than the frequency of the line, and until the frequency of the magnetic impulses becomes equal to the frequency of the line the armature will not vibrate to any appreciable extent. When these frequencies are equal, the reed armature vibrates at its natural rate. However, the angular magnitude of these vibrations is a function of the intensity of the magnetic effect produced by the windings, which effect varies with the phase relation between the currents of the line and the incoming generator. If the currents are opposite in phase, no real magnetic effect is apparent, but when the currents are of the same phase the magnetic effects are added and the intensity thereof is a maximum. The contact 28 may be so adjusted that the armature will contact therewith only when the amplitude of the vibrations is a maximum, which condition occurs only when the two currents are alike in both frequency and phase relation. Of course, the magnetizing effect of the winding 32 will increase as the pressure across its terminal increases; but this effect will not affect the vibrating armature in any way other than to increase the amplitude of vibration to some extent, and can, consequently, be taken care of by the proper adjustment of the contact 28.

As the armature 21, forms a portion of the local circuit supplied by the battery 39, engagement of the armature with the contact 28 will close this circuit and energize the magnet 40, to move the switch arm 41 to closed position. A dash pot 48, or other retarding device, may be used, in connection with the switch arm 41, to prevent the closing of this switch by an accidental engagement of the armature 21 with the contact 28. With such a device, a plurality of successive contacts, such as are realized when the armature is vibrating at its natural period and with maximum amplitude, is necessary to effect closure of switch 41. The relatively fixed contact 42 may also be capable of adjustment to vary the time element in the closure of this switch.

The closure of the switch 41 completes the circuit of the battery or other source 43, and energizes the tripping coil 18, to withdraw the latch 15 and allow the switch 12 to close and connect the generator B to the supply line 10.

Lamps 45 and 46 may, as shown, be connected across like terminals of the supply circuits of the coils 31 and 32, to give a visual indication of the relation between the currents of the two circuits. The flickering of these lamps will show the rate of change of the magnetic flux of the core, and as the rate of change from brilliancy to darkness becomes less, it will indicate that the machines are approaching more closely to synchronism, which latter condition is indicated by the lamps remaining dark. It will be obvious, however, that the lamp connections may be reversed, that is, the lamp terminals may be connected to opposite sides of the two circuits, and with this arrangement the steady brilliancy of the lamps will indicate synchronism. A hand switch 49 allows mechanical closing of the circuit of the main switch tripping magnets, in case such operation is desirable in connection with the use of lamps as synchronism indicating means.

When any unit has been properly connected to the line, for instance, generator B, the switches b and 36 may be opened, and switch 47, in the circuit of coil 31, may also be opened, since the synchronizing apparatus will be of no particular use at this time.

It will be obvious that what has been described with relation to generator B, applies as well to any of the machines which it may be desirable to connect in parallel with whichever unit or units are already supplying the line.

Figure 2:
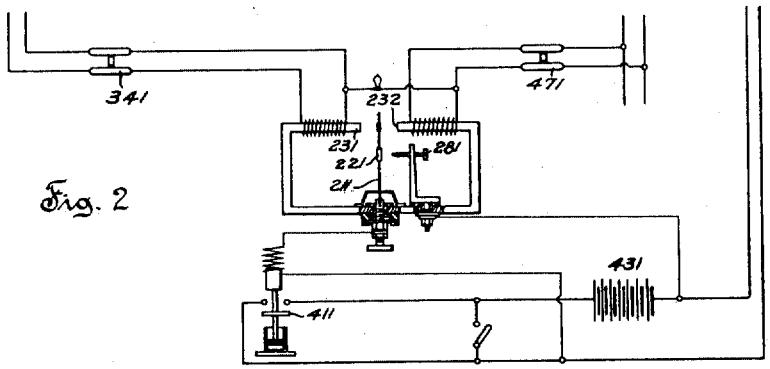
Fig. 2 is a partial diagrammatic view, similar to that of Fig. 1 and showing, in elevation, a modified form of the synchronizing apparatus.

In Fig. 2, is shown a modified form of the synchronizer illustrated in Fig. 1. The synchronizer of Fig. 2 differs from that of Fig. 1 in that the core 20 is provided with a plurality of the pole faces 231 and 232, with which the reed armature 211 is adapted to engage, or, at least, to be drawn toward. A contact portion 221 is secured to the reed to engage as adjustable contact 281. While a certain type of switch is shown at 411, for closing the circuit of the battery 431, it is quite obvious that a switch similar to that shown in Fig. 1, at 41, 42, may be used with the synchronizer of Fig. 2. The operation of the synchronizer with relation to the supply units is similar to that described in connection with Fig. 1. The switch operating circuit being closed, when the reed armature 211 attains a rate of vibration equal to its natural period and such vibrations are of maximum amplitude, the contact 221 is brought into engagement with the contact 281.

It will be noted that the two sources 39 and 43, of Fig. 1, have been combined in a single source 431, in Fig. 2. It will be obvious that either a single source or two separate sources of local current may be used with the synchronizer of either Fig. 1 or Fig. 2.

It will be apparent that the apparatus described as embodying this invention acts in a decidedly accurate manner, and perfectly and automatically connects the two machines when in synchronism; and due to the fact that judgment of any individual is not a necessary factor in deciding when the machines are in exact synchronism, many delays and accidents may be avoided. It will also be apparent that the synchronizer may be used in connection with any two alternating current machines, where it is desirable to bring one machine into synchronism with the other.

It should be understood that it is not desired to be limited to the exact details of construction shown and described, for obvious modifications will occur to a person skilled in the art.

It is claimed and desired to secure by Letters Patent:

1. In a synchronizing apparatus for alternating current circuits, an electromagnetic device comprising a plurality of energizing coils for producing fluxes dependent upon the phase and frequency relations of the currents in separate circuits, an armature of the vibratory type responsive to magnetic flux produced by said energizing coils, an electrical circuit, a switch in said circuit, and means for effecting circuit-controlling actuation of said switch only upon the vibration of said armature at its natural frequency for a time sufficient to insure that currents of substantially the same frequency and phase relation are flowing in the circuits of said energizing coils, said means comprising a circuit-controlling device actuated by said armature on movement thereof to a predetermined extent, and means for preventing the circuit-controlling actuation of said switch due to a single momentary circuit-controlling actuation of said circuit-controlling device by said armature.

2. In a synchronizing apparatus, a core, a plurality of energizing coils for said core, an armature of the vibrating reed type coöperative with a polar portion of said core, an electrical circuit, a switch in said circuit, means for effecting circuit controlling actuation of said switch, said means comprising a part associated with said armature, an element engageable by said part on movement of said armature to a predetermined extent, and a retarding device associated with said switch for insuring its actuation to circuit controlling position only on movement of the part associated with said armature into engagement with the element coöperative therewith at a predetermined rate for a predetermined time.

3. In a synchronizing apparatus, a core, a plurality of energizing coils for said core, an armature of the vibrating reed type for coöperation with a polar portion of said core, a contact mounted adjacent said armature, a contact associated with said armature and engageable with said first contact on movement of said armature to a predetermined extent, an electrical circuit completed on engagement of said contacts, a second electrical circuit, an electromagnetically actuated switch in said second circuit, the actuating coil of said switch being in said first circuit, a retarding device associated with said switch for permitting circuit controlling actuation thereof only on such operation of said armature as effects closure of said local circuit at a predetermined rate for a predetermined time.

4. In an alternating current system of distribution, a line circuit, an alternating circuit machine, synchronizing apparatus comprising an electromagnetic device including a plurality of energizing coils, an armature of the vibrating reed type magnetically responsive to flux produced by said energizing coils, means for connecting one of said coils to said machine, means for connecting the other coil to said line circuit, and electromagnetically controlled means for effecting the connection of said machine to said line circuit, said latter means including a controlling element actuated by said armature, and means for insuring the actuation of said machine connecting means only on vibration of said armature at its natural frequency for a predetermined time.

5. In an alternating current system of distribution, a line circuit, an alternating current generator, an electromagnetically controlled switch for connecting said generator to said line circuit, means for effecting the operation of said switch when the currents in said generator and said line circuit are of the same frequency and phase relation, said means comprising a core, two energizing coils therefor, an armature of the vibratory type coöperative with a polar portion of said core, means for adjusting the natural frequency of vibration of said armature to equality with the frequency of said line circuit, an electromagnetically controlled switch for completing the circuit of the operating coil of said first switch, means associated with said armature for controlling the operation of said second electromagnetically controlled switch, and retarding means associated with said latter switch to insure circuit controlling operation thereof only on vibration of said armature at its natural period for a predetermined time.

6. In an alternating current system of distribution, a line circuit, a generator, an electromagnetically controlled switch for connecting said generator to said line circuit, means for automatically effecting the operation of said switch when the frequency and phase relation of said generator and said line circuit are in agreement, said means comprising a core, a plurality of energizing coils for said core, means for connecting one of said coils to said line circuit, means for connecting the other of said coils to said generator, an armature of the vibrating reed type coöperative with a polar portion of said core, an electromagnetically controlled switch for completing the circuit of the operating coil of said first switch, a local circuit including the operating coil of said second switch, and normally open contacts, one of said contacts being associated with said armature and engageable with the other contact to cause the actuation of said second switch, retarding means associated with said second switch for insuring the circuit controlling operation of said latter switch only when the currents in said generator and said line circuit are of the same frequency and phase relation and said armature vibrates at its natural frequency for a predetermined time.

Milwaukee, Wis., November 4, 1913.

In testimony whereof, the signature of the inventor is affixed hereto in the presence of two witnesses.

JAMES G. ZIMMERMAN.

Witnesses:
J. J. KANE,
W. H. LIEBER.

Copies of this patent may be obtained for five cents each, by addressing the "Commissioner of Patents, Washington, D. C."

Correction in Letters Patent No. 1,231,109.

It is hereby certified that in Letters Patent No. 1,231,109, granted June 26, 1917, upon the application of James G. Zimmerman, of Milwaukee, Wisconsin, for an improvement in "Automatic Synchroiizers," an error appears in the printed specification requiring correction as follows: Page 4, lines 37-38, claim 4, for the word "circuit" read *current;* and that the said Letters Patent should be read with this correction therein that the same may conform to the record of the case in the Patent Office Signed and sealed this 17th day of July, A. D., 1917.

[SEAL.]

F. W. H. CLAY,

*Acting Commissioner of Patents.*

Cl. 171—118.